United States Patent
Sonoda et al.

(10) Patent No.: US 8,680,805 B2
(45) Date of Patent: Mar. 25, 2014

(54) CONTROL DEVICE THAT DRIVES ONE DRIVEN OBJECT BY TWO MOTORS

(75) Inventors: Naoto Sonoda, Yamanashi (JP); Yasusuke Iwashita, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 93 days.

(21) Appl. No.: 13/495,181

(22) Filed: Jun. 13, 2012

(65) Prior Publication Data

US 2013/0026964 A1    Jan. 31, 2013

(30) Foreign Application Priority Data

Jul. 26, 2011   (JP) .................................. 2011-163474

(51) Int. Cl.
*G05B 11/32* (2006.01)
(52) U.S. Cl.
USPC .................. 318/625; 318/400.17; 318/400.14
(58) Field of Classification Search
USPC ............... 318/625, 490, 400.17, 400.14, 801, 318/689; 701/609
See application file for complete search history.

(56) References Cited

U.S. PATENT DOCUMENTS

| | | | |
|---|---|---|---|
| 6,037,738 A | 3/2000 | Morita et al. | |
| 8,497,642 B2 | 7/2013 | Yasohara et al. | |
| 2001/0028228 A1 | 10/2001 | Toyozawa et al. | |
| 2012/0239237 A1* | 9/2012 | Hashimoto | 701/22 |

FOREIGN PATENT DOCUMENTS

| | | |
|---|---|---|
| CN | 102007682 A | 4/2011 |
| DE | 19944434525 | 3/1996 |
| DE | 10156781 | 2/2003 |
| DE | 20081044341 | 6/2010 |
| JP | 10-326107 A | 12/1998 |
| JP | 3492583 B2 | 2/2004 |
| JP | 2008-22638 A | 1/2008 |
| JP | 2008-43046 A | 2/2008 |
| JP | 2010-88188 A | 4/2010 |

OTHER PUBLICATIONS

A JP Office Action, dated Sep. 18, 2012, issued in JP Application No. 2011-163474.
Office Action mailed Jul. 4, 2013 corresponds to Chinese patent application No. 201210259833.0.
Wang Limei et al.; "Research on Synchrodrive Technique of Dual Motor Based on Decoupling Control and Internal Model Control"; 2009 IEEE; pp. 5334-5337.
Office Action for German application No. DE102012014324.9 dated May 17, 2013.

* cited by examiner

*Primary Examiner* — Karen Masih
(74) *Attorney, Agent, or Firm* — Lowe Hauptman & Ham, LLP

(57) ABSTRACT

A control device that drives one driven object by a first motor and a second motor. A first processor has a first correction amount calculation unit configured to calculate an amount of correction for a torque command to the first motor based on a speed value difference between a speed value of the first motor and a speed value of the second motor in order to suppress vibrations. A second processor has a second correction amount calculation unit configured to calculate an amount of correction for a torque command to the second motor based on a speed value difference between a speed value of the first motor and a speed value of the second motor in order to suppress vibrations.

6 Claims, 5 Drawing Sheets

CONTROL DEVICE THAT DRIVES ONE DRIVEN OBJECT BY TWO MOTORS

RELATED APPLICATIONS

The present application is based on, and claims priority from, Japanese Application Number 2011-163474, filed Jul. 26, 2011, the disclosure of which is hereby incorporated by reference herein in its entirety.

BACKGROUND OF THE INVENTION

1. Field of the Invention

The present invention relates to a control device that drives a driven object, such as a work and tool, by two motors in a machine tool, etc.

2. Description of Related Art

In a machine tool etc., when it is not possible to accelerate and decelerate a driven object by one motor due to the size of the driven object of the motor being large, or when it is not possible to move a driven object in a stable state because backlash between the motor and the driven object is large, tandem control is performed in which one driven object is driven by two motors.

In such tandem control, when the coupling rigidity between two motors is high, there is a case where the drive forces of the two motors interfere with each other due to a slight synchronization error between the two motors and vibrations are produced. In order to suppress such vibrations, a control device having one processor (for example, digital signal processor (DSP)) that suppresses vibrations based on a speed value difference between two motors is proposed in, for example, Japanese Patent No. 3492583 (JP3492583B2).

However, there is a limit to the processing performance of one processor. For example, when the two motors are rotary servomotors having a plurality of stator windings for one rotor and one speed detector or when the two motors are two liner servomotors having a plurality of sliders for one magnet plate and one speed detector, processing of a plurality of motor drive units including current control, etc., is necessary for one motor, and therefore, it is not possible to control two motors by one processor. Consequently, there is a case where it is necessary to control two motors by two processors in order to suppress vibrations that may be produced by the tandem control of the two motors.

SUMMARY OF THE INVENTION

As one aspect, the present invention provides a control unit capable of controlling two motors by two processors in order to control vibrations that may be produced by interference of drive forces between the two motors.

According to one aspect of the present invention, the control device is a control device that drives one driven object by a first motor and a second motor, includes a first processor configured to control the first motor and a second processor configured to control the second processor, wherein the first processor has: a first speed value acquisition unit configured to acquire a speed value of the first motor; a first transmission and reception unit configured to transmit the speed value of the first motor to the second processor and to receive a speed value of the second motor from the second processor; a first speed value difference calculation unit configured to calculate a speed value difference between the speed value of the first motor and the speed value of the second motor, and a first correction amount calculation unit configured to calculate an amount of correction for a torque command to the first motor based on the speed value difference in order to suppress vibrations produced by the interference of the drive forces between the first motor and the second motor, and the second processor has a second speed value acquisition unit configured to acquire a speed value of the second motor; a second transmission and reception unit configured to transmit the speed value of the second motor to the first processor and to receive a speed value of the first motor from the first processor; a second speed value difference calculation unit configured to calculate a speed value difference between the speed value of the first motor and the speed value of the second motor, and a second correction amount calculation unit configured to calculate an amount of correction for a torque command to the first motor based on the speed value difference in order to suppress vibrations produced by the interference of the drive forces between the first motor and the second motor.

Preferably, each of the first correction amount calculation unit and the second correction amount calculation unit has a phase compensation unit configured to advance the phase of the speed value difference and a torsion correction amount calculation unit configured to calculate an amount of torsion correction from the speed value difference of which the phase is advanced or a friction correction amount calculation unit configured to calculate an amount of friction correction from the speed value difference of which the phase is advanced.

Preferably, each of the first motor and the second motor is a rotary servomotor having a plurality of stator windings for one rotor and one speed detector.

Preferably, each of the first motor and the second motor is a linear servomotor having a plurality of sliders for one magnet plate and one speed detector.

According to one aspect of the present invention, it is possible for each of the two processors to acquire both the speed of the first motor and the speed of the second motor in order to suppress vibrations based on a difference between the speed of the first motor and the speed of the second motor. Consequently, it is possible to control the two motors by the two processors in order to suppress vibrations that may be produced by the interference of the drive forces between the two motors.

BRIEF DESCRIPTION OF THE DRAWINGS

The objects, features, and advantages of the present invention will be made clearer by the description of the following embodiments relating to the accompanying drawings.

DETAILED DESCRIPTION

Figure 1:
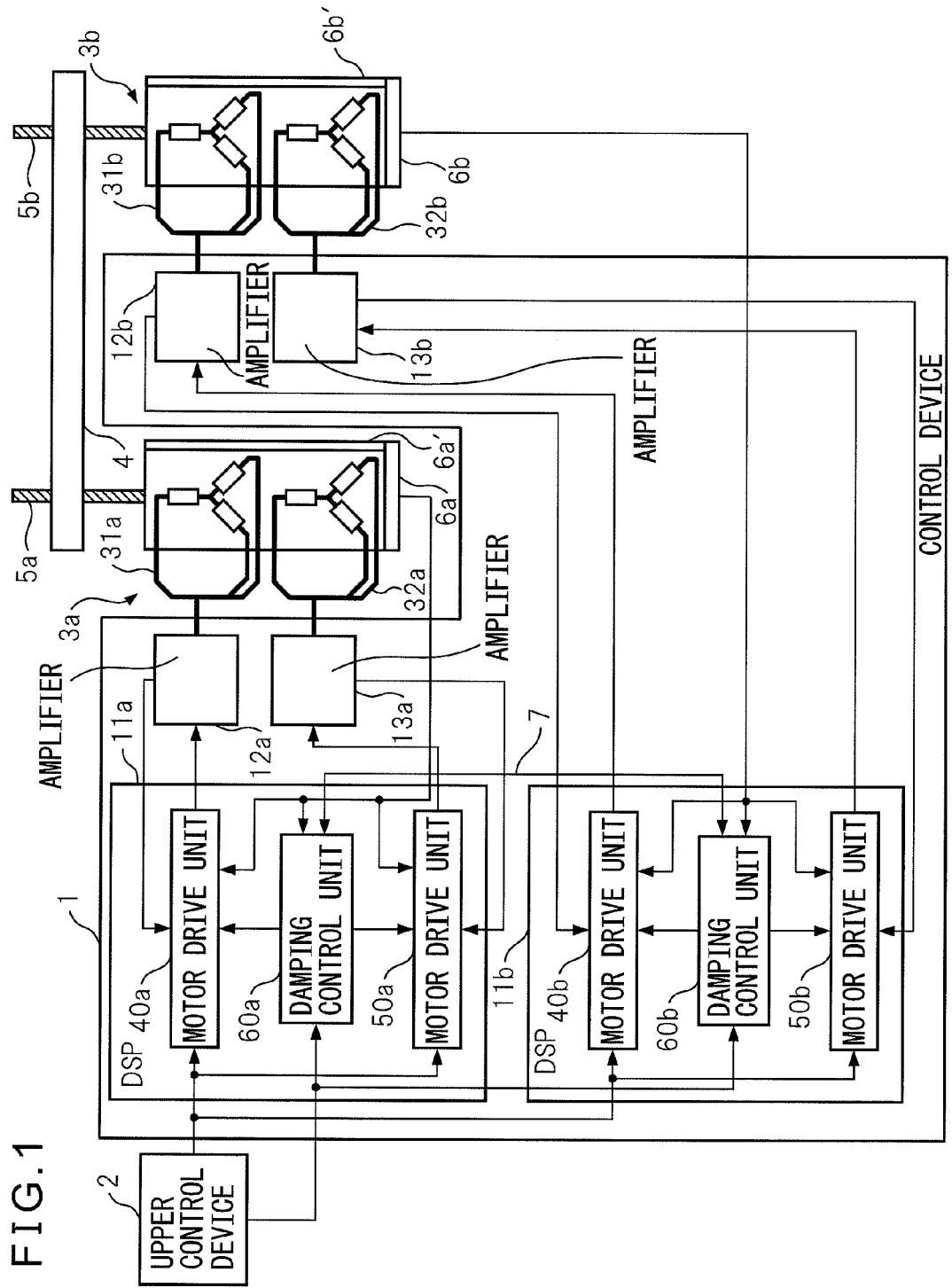
FIG. 1 is a block diagram of a system for driving two rotary servomotors by a control device according to an embodiment of the present invention.

Embodiments of a control device according to the present invention are explained with reference to the drawings. In the drawings, the same symbol is attached to the same component.

Referring to the drawings, FIG. 1 is a block diagram of a system for driving two rotary servomotors by a control device according to an embodiment of the present invention. In FIG. 1, a control device 1 controls the position, speed, torque, etc., of rotary servomotors 3a and 3b, respectively, based on a command signal in accordance with a work process instructed by an upper control device 2, such as a CNC (computer numerical control), connected to the control device 1. By the control of the control device 1, a table 4 as a driven object connected to the rotary servomotors 3a and 3b is caused to slide along ball screws 5a and 5b.

In order for the control device 1 to control the position, speed, torque, etc., of the rotary servomotors 3a and 3b, respectively, there are provided respectively speed detectors 6a and 6b configured to detect the speed (rotating speed) of the rotary servomotors 3a and 3b and to supply the detected speed to the control device 1. For example, an encoder configured to generate a pulse in proportion to the speed of the rotary servomotors 3a and 3b is used as the speed detectors 6a and 6b.

The rotary servomotor 3a has a plurality (in this case, two) of stator windings 31a and 32a for one rotor 6a' and the one speed detector 6a and the drive shaft (not shown schematically) of the rotary servomotor 3a linked to the ball screw 5a plays a role of a master shaft. On the other hand, the rotary servomotor 3b has a plurality (in this case, two) of stator windings 31b and 32b for one rotor 6b' and the one speed detector 6b and the drive shaft (not shown schematically) of the rotary servomotor 3b linked to the ball screw 5b plays a role of a slave shaft.

The control device 1 has DSPs 11a and 11b as processors and amplifiers 12a, 12b, 13a, and 13b. The DSP 11a has motor drive units 40a and 50a and a damping control unit 60a. Similarly, the DSP 11b has motor drive units 40b and 50b and a damping control unit 60b.

Figure 2:
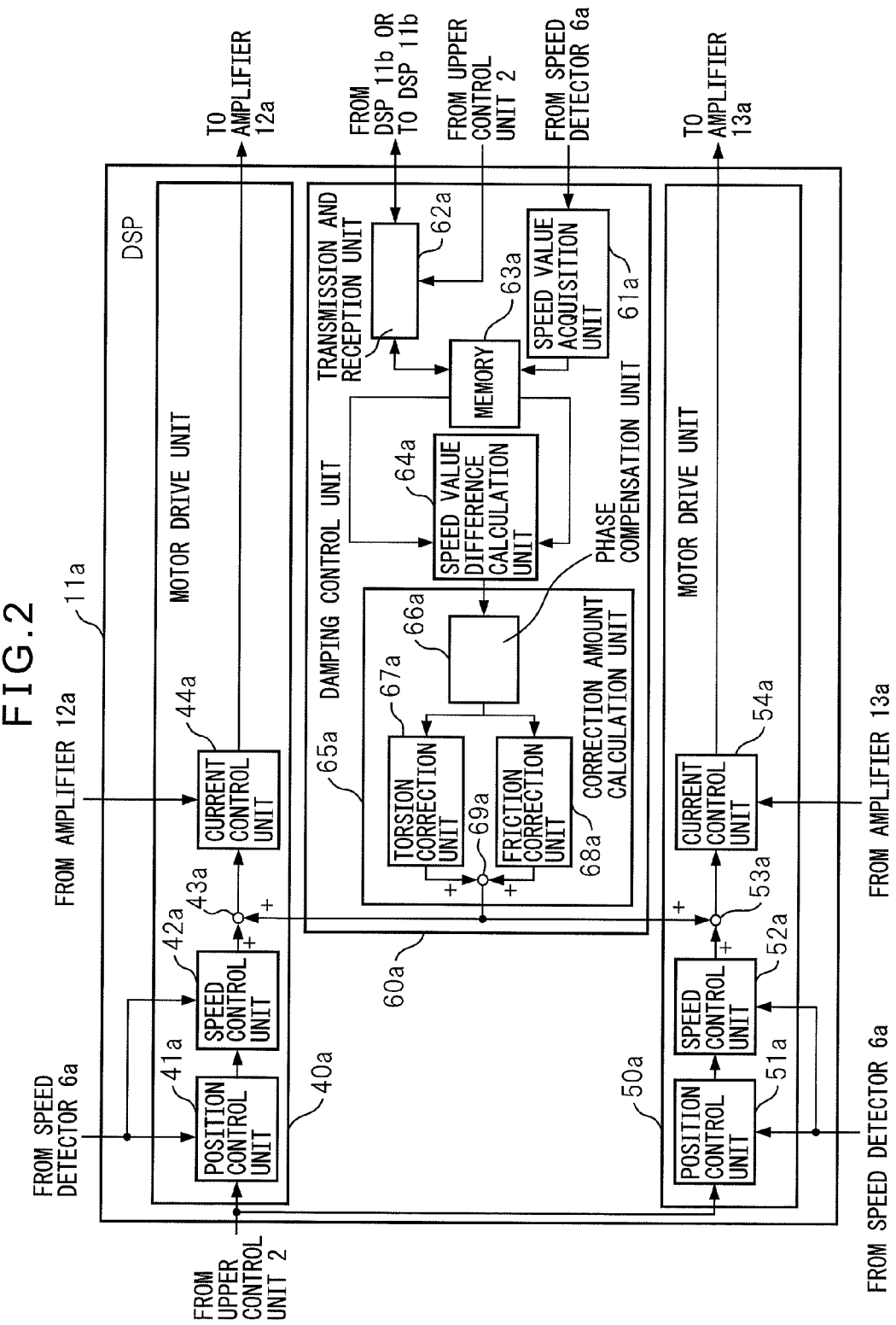
FIG. 2 is a block diagram showing in detail one of processors of the control device in FIG. 1.

FIG. 2 is a block diagram showing in detail one of the processors of the control device in FIG. 1. In FIG. 2, the motor drive unit 40a has a position control unit 41a, a speed control unit 42a, an adder 43a, and a current control unit 44a. The position control unit 41a performs an operation in accordance with a position command signal input from the upper control unit 2 in synchronization with the motor drive unit 50a and a position feedback signal generated by integrating a speed feedback signal from the speed detector 6a based on a predetermined position gain. The speed control unit 42b performs an operation in accordance with a speed command signal from the position control unit 41a and a speed feedback signal from the speed detector 6a based on a predetermined speed gain.

The adder 43a adds a torque command signal from the speed control unit 42a, which is input to one of input parts, and a correction amount signal, as described later, which is input to the other input part, and supplies an output signal of the adder 43a to the current control unit 44a. The current control unit 44a performs an operation in accordance with the output signal of the adder 43a and a current feedback signal from the amplifier 12a. The amplifier 12a controls power to be supplied to the rotary servomotor 3a in accordance with an output signal of the current control unit 44a, which is input to the amplifier 12a.

Similarly, the motor drive unit 50a has a position control unit 51a, a speed control unit 52a, an adder 53a, and a current control unit 54a. The position control unit 51a performs an operation in accordance with a position command signal input from the upper control unit 2 in synchronization with the motor drive unit 40a and a position feedback signal generated by integrating a speed feedback signal from the speed detector 6a based on a predetermined position gain. The speed control unit 52a performs an operation in accordance with a speed command signal from the position control unit 51a and a speed feedback signal from the speed detector 6a based on a predetermined speed gain.

The adder 53a adds a torque instruction signal from the speed control unit 52a, which is input to one of input parts, and a correction amount signal, as described later, which is input to the other input part, and supplies an output signal of the adder 53a to the current control unit 54a. The current control unit 54a performs an operation in accordance with the output signal of the adder 53a and a current feedback signal from the amplifier 13a. The amplifier 13a controls power to be supplied to the rotary servomotor 3a in accordance with an output signal of the current control unit 54a, which is input to the amplifier 13a.

The damping control unit 60a suppresses vibrations produced by the interference of the drive forces between the rotary servomotor 3a and the rotary servomotor 3b. To do this, the damping control unit 60a has a speed value acquisition unit 61a, a transmission and reception unit 62a, a memory 63a, a speed value difference calculation unit 64a, and a correction amount calculation unit 65a.

The speed value acquisition unit 61a acquires a speed feedback signal from the speed detector 6a as the speed value of the rotary servomotor 3a at a predetermined sampling period T (for example, T=1 millisecond) and stores in the memory 63a as the speed feedback value of the rotary servomotor 3a.

The transmission and reception unit 62a transmits the speed value of the rotary servomotor 3a stored in the memory 63a to the DSP 11b and receives the speed value of the rotary servomotor 3b acquired by the DSP 11b in the same way the speed value acquisition unit 61a acquires the speed value of the rotary servomotor 3a. Communication between the DSP 11a and the DSP 11b is performed using a communication path 7 (FIG. 1), such as an TIC bus, interposed between the DSP 11a and the DSP 11b based on the control of the upper control device 2.

The speed value difference calculation unit 64a reads the speed value of the rotary servomotor 3a and the speed value of the rotary servomotor 3b from the memory 63a and calculates a speed value difference between the speed value of the rotary servomotor 3a and the speed value of the rotary servomotor 3b.

The correction amount calculation unit 65a calculates an amount of correction for the torque command to the rotary servomotor 3a in order to suppress vibrations produced by the interference of the drive forces between the rotary servomotor 3a and the rotary servomotor 3b. To do this, the correction amount calculation unit 65a has a phase compensation unit 66a, a torsion correction unit 67a, and a friction correction unit 68a.

The phase compensation unit 66a has a function to advance the phase of a speed value difference signal output by the speed value difference calculation unit 64a. The torsion correction unit 67a generates a torsion correction amount signal from the speed value difference signal of which the phase is advanced by the phase compensation unit 66a. The friction correction unit 68a generates a friction correction amount signal from the speed value difference signal of which the phase is advanced by the phase compensation unit 66a. An adder 69a adds the torsion correction amount signal from the torsion correction unit 67a, which is input to one of input parts, and the friction correction amount signal from the friction correction unit 68a, which is input to the other input part, and supplies a correction amount signal corresponding to the sum of the torsion correction amount signal and the friction correction amount signal to the other input part of the adder 43a and to the other input part of the adder 53a. Consequently, to the current control unit 44a, a signal is input, which is the torque command signal from the speed control unit 42a to which the correction amount signal from the adder 69a is added, and to the current control unit 54a, a signal is input, which is the torque command signal from the speed control unit 52a to which the correction amount signal from the adder 69a is added.

It is possible for the phase compensation unit 66a to improve the damping effect by compensating for a delay in the system shown in FIG. 1. Further, it is possible for the torsion correction unit 67a to suppress vibrations produced by the interference of the drive forces between the rotary servomotor 3a and the rotary servomotor 3b by performing torsion correction (spring correction). Furthermore, it is possible for the friction correction unit 68a to suppress vibrations produced by the interference of the drive forces between the rotary servomotor 3a and the rotary servomotor 3b by performing friction correction.

Figure 3:
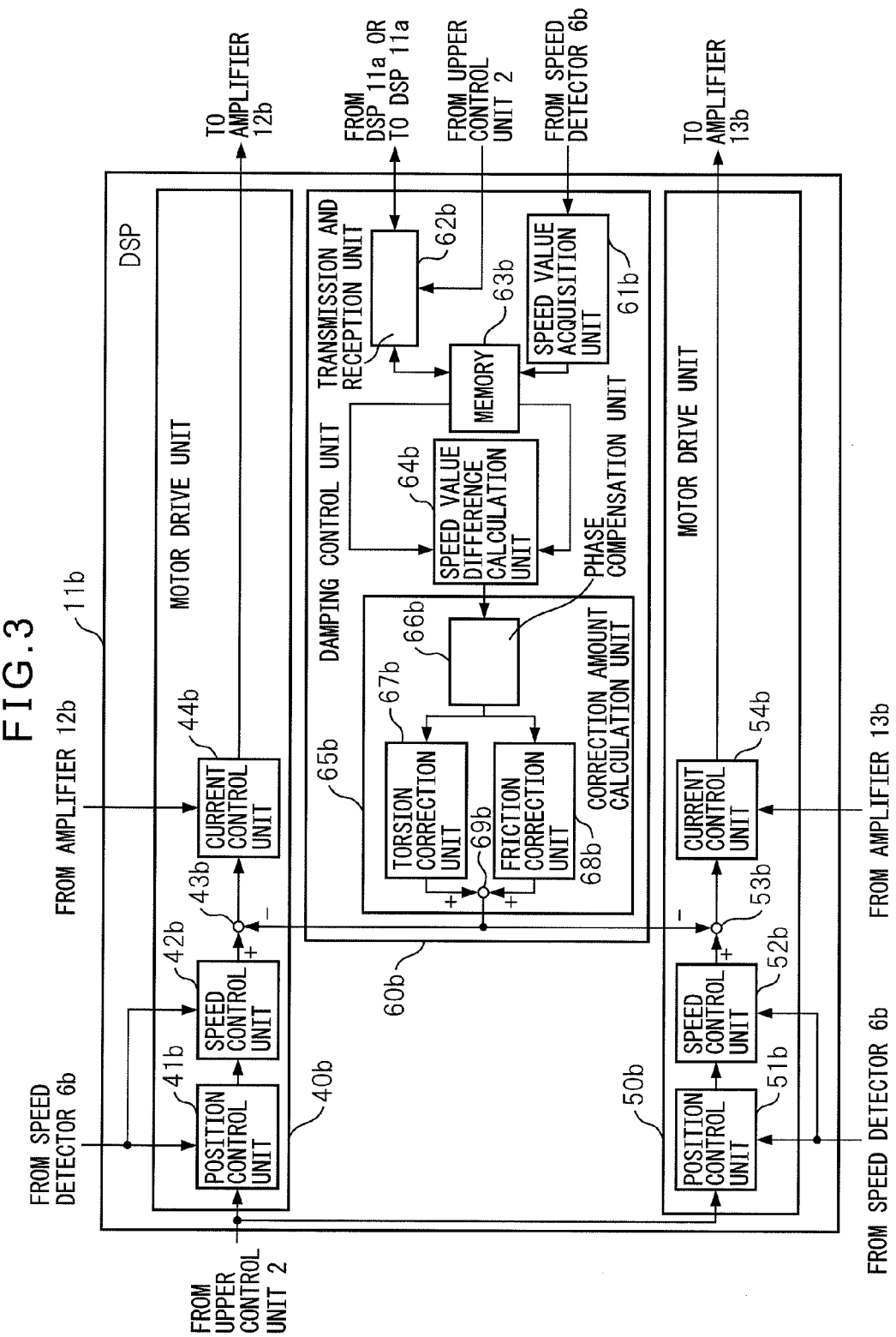
FIG. 3 is a block diagram showing in detail the other processor of the control device in FIG. 1.

FIG. 3 is a block diagram showing in details the other processor of the control device in FIG. 1. In FIG. 3, the motor drive unit 40b has a position control unit 41b, a speed control unit 42b, and a current control unit 44b having the same functions of the position control unit 41a, the speed control unit 42a, and the current control unit 44a in FIG. 2, respectively, and has a subtracter 43b in place of the adder 43a in FIG. 2.

Similarly, the motor drive unit 50b has a position control unit 51b, a speed control unit 52b, and a current control unit 54b having the same functions of the position control unit 51a, the speed control unit 52a, and the current control unit 54a in FIG. 2, respectively, and has a subtracter 53b in place of the adder 53a in FIG. 2.

The damping control unit 60b has a speed value acquisition unit 61b, a transmission and reception unit 62b, a memory 63b, a speed value difference calculation unit 64b, and a correction amount calculation unit 65b having the same functions of the speed value acquisition unit 61a, the transmission and reception unit 62a, the memory 63a, the speed value difference calculation unit 64a, and the correction amount calculation unit 65a in FIG. 2, respectively.

The motor drive unit 40b has the subtracter 43b in place of the adder 43a in FIG. 2 and the motor drive unit 50b has the subtracter 53b in place of the adder 53a in FIG. 2, and therefore, to the current control unit 44b, a signal is input, which is the torque command signal from the speed control unit 42b from which the correction amount signal from the adder 69a is subtracted, and to the current control unit 54a, a signal is input, which is the torque command signal from the speed control unit 52a from which the correction amount signal from the adder 69a is subtracted.

Figure 4:
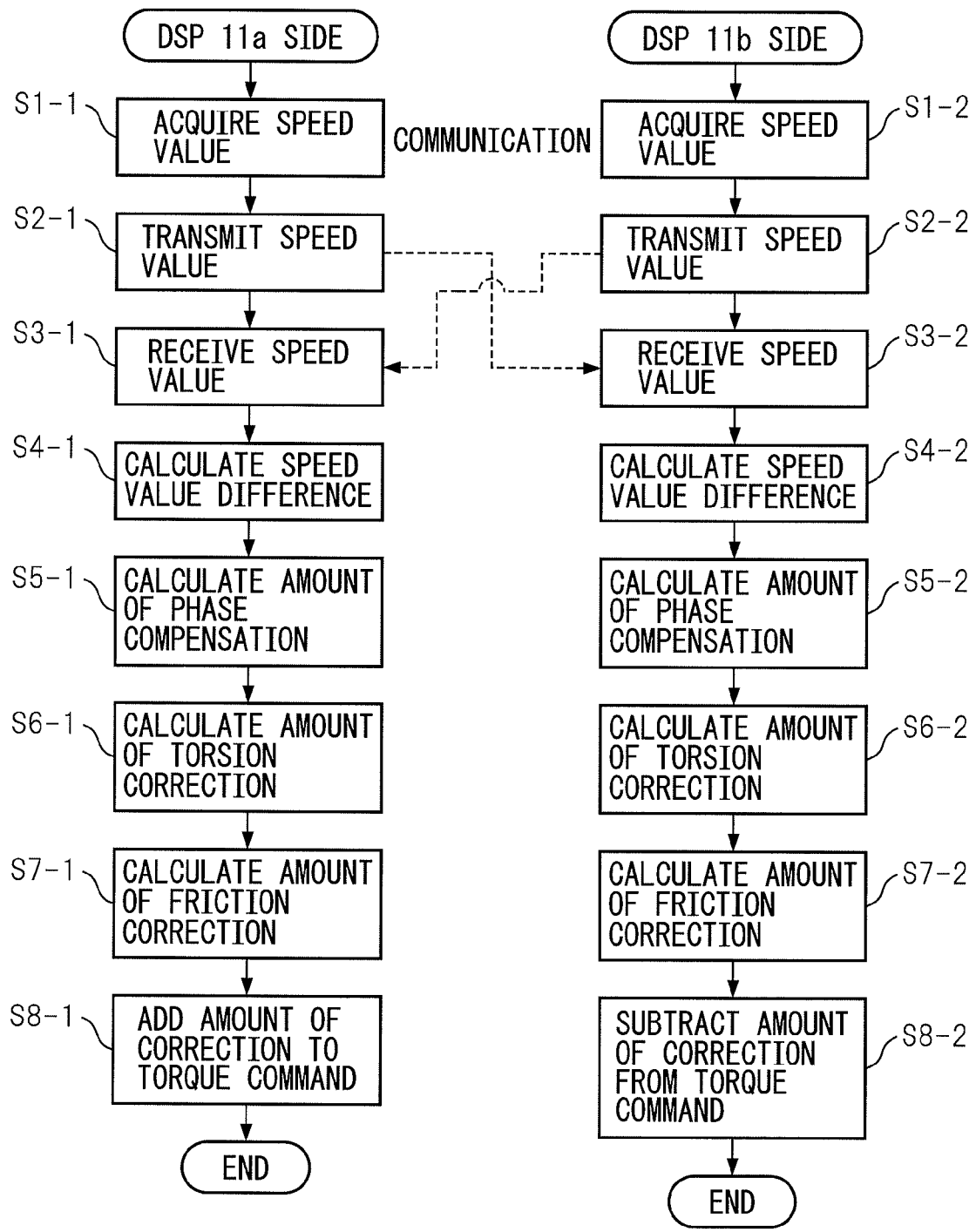
FIG. 4 is a flowchart of an operation of the control device in FIG. 1.

FIG. 4 is a flowchart of the operation of the control device in FIG. 1. The processing of this flowchart is performed a predetermined times after the DSP 11a and the DSP 11b receive the command signal to drive the table 4 from the upper control device 2.

First, in step S1-1, the speed value acquisition unit 61a acquires the speed value of the rotary servomotor 3a and in step S1-2, the speed value acquisition unit 61b acquires the speed value of the rotary servomotor 3b.

Next, in step S2-1, the transmission and reception unit 62a transmits the speed value of the rotary servomotor 3a to the DSP 11b and in step S2-2, the transmission and reception unit 62b transmits the speed value of the rotary servomotor 3b to the DSP 11a.

Next, in step S3-1, the transmission and reception unit 62a receives the speed value of the rotary servomotor 3b from the DSP 11b and in step S3-2, the transmission and reception unit 62b receives the speed value of the rotary servomotor 3a from the DSP 11a.

Next, in step S4-1, the speed value difference calculation unit 64a calculates a speed value difference between the speed value of the rotary servomotor 3a and the speed value of the rotary servomotor 3b and in step S4-2, the speed value difference calculation unit 64b calculates a speed value difference between the speed value of the rotary servomotor 3a and the speed value of the rotary servomotor 3b.

Next, in step S5-1, the phase compensation unit 66a calculates an amount of phase compensation of a speed value difference signal output by the speed value difference calculation unit 64a and in step S5-2, a phase compensation unit 66b calculates an amount of phase compensation of a speed value difference signal output by the speed value difference calculation unit 64b.

Next, in step S6-1, the torsion correction unit 67a calculates an amount of torsion correction from the speed value difference signal of which the phase is compensated by the phase compensation unit 66a and in step S6-2, a torsion correction unit 67b calculates an amount of torsion correction from the speed value difference signal of which the phase is compensated by the phase compensation unit 66b.

Next, in step S7-1, the friction correction unit 68a calculates an amount of friction correction from the speed value difference signal of which the phase is compensated by the phase compensation unit 66a and in step S7-2, a friction correction unit 68b calculates an amount of friction correction from the speed value difference signal of which the phase is compensated by the phase compensation unit 66b.

Next, in step S8-1, the adder 43a adds the amount of correction (in this case, the sum of the amount of torsion correction and the amount of friction correction) to the torque command signal from the speed control unit 42a and the adder 53a adds the amount of correction to the torque command from the speed control unit 52a and the processing on the side of the DSP 11a is exited. Further, in step S8-2, the subtracter 43b subtracts the amount of correction from the torque command from the speed control unit 42b and the adder 53b subtracts the amount of correction from the torque command from the speed control unit 52b and the processing on the side of the DSP 11b is exited.

According to the present embodiment, it is possible for each of the DSP 11a and the DSP 11b to acquire both the speed value of the rotary servomotor 3a and the speed value of the rotary servomotor 3b in order to suppress vibrations based on the speed value difference between the speed value of the rotary servomotor 3a and the speed value of the rotary servomotor 3b. Consequently, it is possible to control the two rotary servomotor 3a and rotary servomotor 3b by the two DSP 11a and DSP 11b in order to suppress vibrations that may be produced by the interference of the drive forces between the rotary servomotor 3a and the rotary servomotor 3b.

Figure 5:
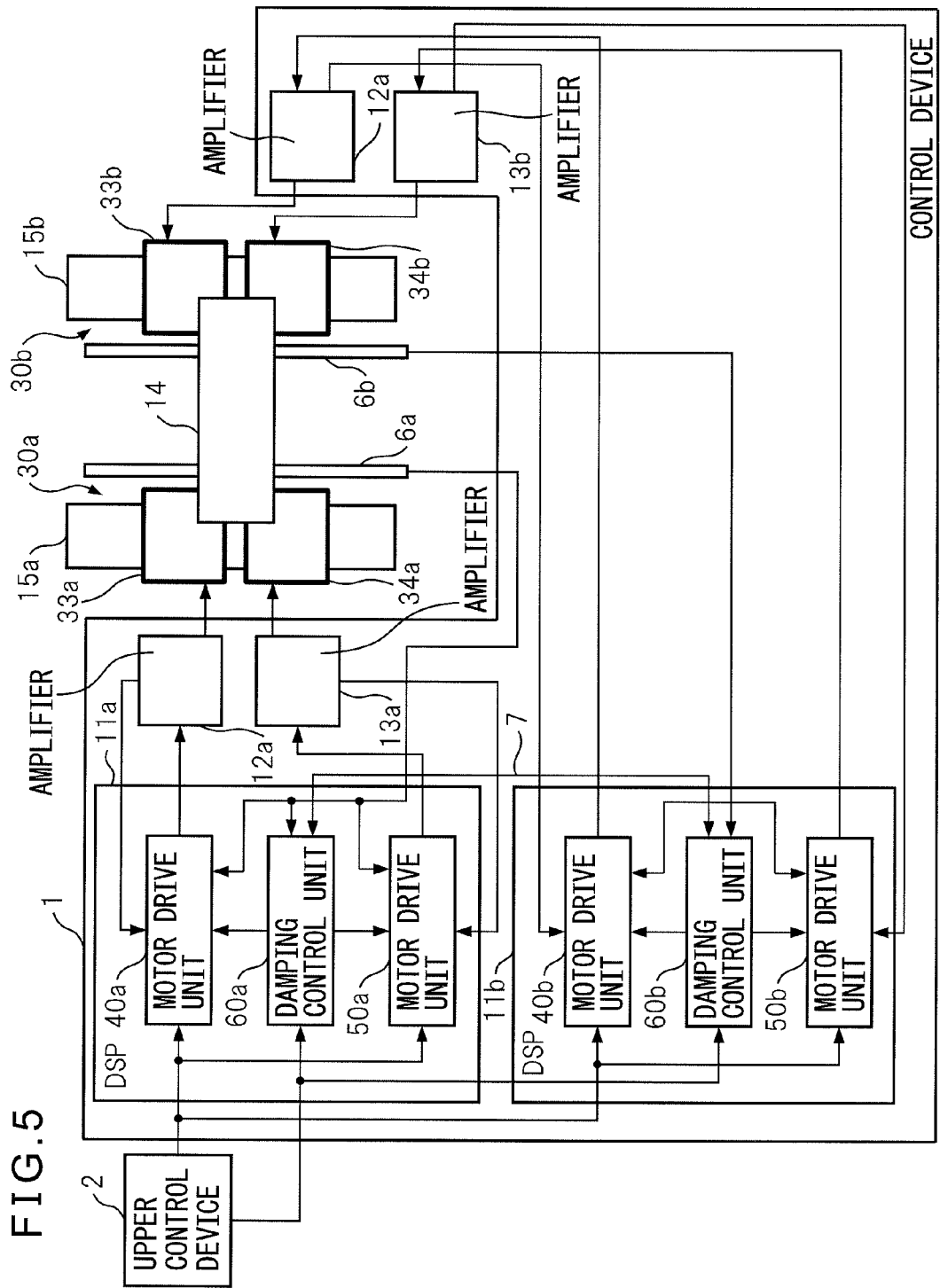
FIG. 5 is a block diagram of a system for driving two linear servomotors by a control device according to an embodiment of the present invention.

FIG. 5 is a block diagram of a system for driving two linear motors by the control device according to an embodiment of the present invention. In FIG. 5, the control device 1 controls the position, speed, torque, etc., of linear servomotors 30a and 30b, respectively, based on a command signal in accordance with a work process from the upper control device 2, such as a CNC (computer numerical control), connected to the control device 1. By the control of the control device 1, a table 14 as a driven object connected to the linear servomotors 30a and 30b is caused to slide along magnet plates 15a and 15b. The control device 1, the upper control device 2, and the speed detectors 6a and 6b in FIG. 5 have the same configurations as those of the control device 1, the upper control device 2, and the speed detectors 6a and 6b in FIG. 1, and therefore, an explanation is omitted.

The linear servomotor 30a has a plurality (in this case, two) of sliders 33a and 34a for the one magnet plate 15a and the one speed detector 6a. On the other hand, the linear servomotor 30b has a plurality (in this case, two) of sliders 33b and 34b for the one magnet plate 15b and the one speed detector 6b.

According to the present embodiment, it is possible to control the two linear servomotor 30a and linear servomotor 30b by the two DSP 11a and DSP 11b in order to suppress vibrations caused by the interference of the drive forces between the linear servomotor 30a and the linear servomotor 30b by the control device 1 performing damping control as described above.

The present invention is not limited to the above-mentioned embodiments and there can be a number of alterations and modifications. For example, in the above-mentioned embodiments, the case where the two rotary servomotors or the two linear servomotors are controlled by the control device according to the present invention, is explained, however, it is also possible to control two vibration servomotors, etc., by the control device according to the present invention.

Further, as a driven object, it is also possible to use an arm, a work to be attached thereto and detached therefrom, etc. Furthermore, in the above-mentioned embodiments, the case where both torsion correction and friction correction are performed, is explained, however, it may also be possible to perform one of torsion correction and friction correction.

As above, the present invention is explained in relation to the preferred embodiments, however, it should be understood by persons skilled in the art that various alterations and modification can be made without deviating from the scope disclosed by claims.

The invention claimed is:

1. A control device that drives one driven object by a first motor and a second motor, comprising:
    a first processor that controls said first motor; and
    a second processor that controls said second motor, wherein
    said first processor has:
        a first speed value acquisition unit configured to acquire a speed value of the first motor;
        a first transmission and reception unit configured to transmit the speed value of said first motor to said second processor and to receive a speed value of said second motor from said second processor;
        a first speed value difference calculation unit configured to calculate a speed value difference between the speed value of said first motor and the speed value of said second motor; and
        a first correction amount calculation unit configured to calculate an amount of correction for a torque command to said first motor based on said speed value difference in order to suppress vibrations produced by interference of drive forces between said first motor and said second motor, and
    said second processor has:
        a second speed value acquisition unit configured to acquire a speed value of said second motor;
        a second transmission and reception unit configured to transmit the speed value of said second motor to said first processor and to receive a speed value of said first motor from said first processor;
        a second speed value difference calculation unit configured to calculate a speed value difference between the speed value of said first motor and the speed value of said second motor; and
        a second correction amount calculation unit configured to calculate an amount of correction for a torque command to said second motor based on said speed value difference in order to suppress vibrations produced by interference of drive forces between said first motor and said second motor.

2. The control device according to claim 1, wherein
each of said first correction amount calculation unit and said second correction amount calculation unit has:
a phase compensation unit configured to advance the phase of said speed value difference; and
at least one of a torsion correction amount calculation unit configured to calculate an amount of torsion correction from the speed value difference of which said phase is advanced and a friction correction amount calculation unit configured to calculate an amount of friction correction from the speed value difference of which said phase is advanced.

3. The control device according to claim 1, wherein
each of said first motor and said second motor is a rotary servomotor having a plurality of stator windings for one rotor and one speed detector.

4. The control device according to claim 1, wherein
each of said first motor and said second motor is a linear servomotor having a plurality of sliders for one magnet plate and one speed detector.

5. The control device according to claim 2, wherein
each of said first motor and said second motor is a rotary servomotor having a plurality of stator windings for one rotor and one speed detector.

6. The control device according to claim 2, wherein
each of said first motor and said second motor is a linear servomotor having a plurality of sliders for one magnet plate and one speed detector.

* * * * *